United States Patent
Björnemo et al.

(10) Patent No.: US 10,274,635 B2
(45) Date of Patent: Apr. 30, 2019

(54) JOINT INVERSION OF SUBSURFACE RESISTIVITY AND NOISE PARAMETERS

(71) Applicant: PGS Geophysical AS, Lilleaker, Oslo (NO)

(72) Inventors: Lars Erik Magnus Björnemo, Kista (SE); Carl Joel Gustav Skogman, Kista (SE)

(73) Assignee: PGS Geophysical AS, Oslo (NO)

( * ) Notice: Subject to any disclaimer, the term of this patent is extended or adjusted under 35 U.S.C. 154(b) by 78 days.

(21) Appl. No.: 15/002,101

(22) Filed: Jan. 20, 2016

(65) Prior Publication Data
US 2016/0238735 A1    Aug. 18, 2016

Related U.S. Application Data

(60) Provisional application No. 62/116,790, filed on Feb. 16, 2015.

(51) Int. Cl.
*G01V 3/00*    (2006.01)
*G01V 3/38*    (2006.01)
(Continued)

(52) U.S. Cl.
CPC .......... *G01V 3/38* (2013.01); *G01V 3/08* (2013.01); *G01V 3/081* (2013.01); *G01V 3/083* (2013.01); *G01V 3/10* (2013.01); *G01V 2003/084* (2013.01)

(58) Field of Classification Search
CPC .... G01V 2003/084; G01V 3/08; G01V 3/081; G01V 3/083; G01V 3/10
(Continued)

(56) References Cited

U.S. PATENT DOCUMENTS 6,914,433 B2    7/2005    Wright et al.
7,142,481 B1    11/2006    Metzbower et al.
(Continued)

OTHER PUBLICATIONS

"Inversion algorithms for large-scale geophysical electromagnetic measurements" IOP Publishing, Inverse Problems 25 (2009).
(Continued)

*Primary Examiner* — Giovanni Astacio-Oquendo
*Assistant Examiner* — Raul J Rios Russo

(57) ABSTRACT

A method for jointly inverting subsurface resistivities and noise parameters that may comprise the steps of identifying electromagnetic data acquired from one or more electromagnetic sensors, wherein the electromagnetic data includes a source-generated signal and noise, and jointly inverting at least subsurface resistivities and noise parameters based on the electromagnetic data. A marine electromagnetic survey system, that may comprise a data processing system configured to identify electromagnetic data acquired from one or more electromagnetic sensors, wherein the electromagnetic data includes a source-generated signal and noise and jointly invert subsurface resistivities and noise based on the electromagnetic data. A non-transitory machine-readable medium storing instructions executable by a data processing system that may cause the machine to identify electromagnetic data acquired from one or more electromagnetic sensors, wherein the electromagnetic data includes a source-generated signal and noise, and jointly invert subsurface resistivities and noise based on the electromagnetic data.

22 Claims, 2 Drawing Sheets

(51) Int. Cl.
*G01V 3/08* (2006.01)
*G01V 3/10* (2006.01)

(58) Field of Classification Search
USPC ................................ 324/323, 327, 332, 376
See application file for complete search history.

(56) References Cited

U.S. PATENT DOCUMENTS

| | | | |
|---|---|---|---|
| 7,536,262 B2 | 5/2009 | Hornbostel et al. | |
| 7,957,904 B2 | 6/2011 | Ziolkowski et al. | |
| 8,754,649 B2 | 6/2014 | Südow et al. | |
| 2007/0294036 A1* | 12/2007 | Strack | G01V 3/083 702/14 |
| 2008/0061790 A1* | 3/2008 | Strack | G01V 3/083 324/336 |
| 2008/0094066 A1* | 4/2008 | Watts | G01V 3/083 324/337 |
| 2009/0015262 A1* | 1/2009 | Strack | G01V 3/083 324/348 |
| 2009/0204327 A1* | 8/2009 | Lu | G01V 3/083 702/7 |
| 2009/0243616 A1* | 10/2009 | Loehken | G01V 3/083 324/336 |
| 2009/0254320 A1* | 10/2009 | Lovatini | G01V 3/083 703/5 |
| 2009/0265111 A1* | 10/2009 | Helwig | G01V 3/083 702/7 |
| 2010/0109671 A1* | 5/2010 | Hobbs | G01V 3/12 324/334 |
| 2013/0179137 A1* | 7/2013 | Mullur | G01V 11/00 703/10 |
| 2014/0207379 A1 | 7/2014 | Björnemo | |
| 2014/0257780 A1* | 9/2014 | Jing | G01V 99/005 703/6 |
| 2017/0227668 A1* | 8/2017 | Mattsson | G01V 3/08 |

OTHER PUBLICATIONS

Kozminchuck, Brian, "Kalman Filter Based Architectures for Interferences Excisions (U)", Defence Research Establishment Ottawa, Report No. 1118, 1991, Canada.

Collings, I.B, et al., "An HMM Approach to Adaptive Demodulation of Qam Signals in Fading Channels," International Journal of Adaptive Control and Signal Processing, vol. 8, ppg 457-474 (1994).

Sennott, Jim et al., "A GPS Carrier Phase Processor for Real-Time High Dynamics Tracking," Tracking and Imaging Systems, Inc.

Lindbom, Lars, et al., "Tracking of Time-Varying Mobile Radio Channels—Part I: The Wiener LMS Algorithm," IEEE Transactions on Communications, vol. 49, No. 12, Dec. 2001.

Ljung, Linnart, "System Identification, Theory for the User," ISBN 0-13-881640-9, Prentice-Hall 1987, pp. 212-213 and 361-364.

\* cited by examiner

JOINT INVERSION OF SUBSURFACE RESISTIVITY AND NOISE PARAMETERS

BACKGROUND

The present disclosure relates to marine electromagnetic surveying and, more particularly, to systems and methods of determining subsurface resistivity in which processing and inversion are combined into a single step.

One type of marine geophysical surveying includes marine electromagnetic surveying, in which geophysical data may be collected or acquired. Marine electromagnetic surveying is used, among other purposes, to infer spatial distribution of electrical subsurface resistivity of formations below the bottom of a body of water, such as a lake or ocean. The spatial distribution of subsurface resistivity is used to assist in determining the presence of hydrocarbon-bearing formations in the subsurface, potentially resulting in cost saving by better targeted drilling operations. Marine electromagnetic surveying generally includes inducing an electromagnetic field in the subsurface formations (e.g., by injecting electrical current in the water), and measuring one or more parameters related to a response of the subsurface formations to the induced electromagnetic field, the response referred to herein as an "electromagnetic earth response." The current may diffuse through the sea water and subsurface formation with an electric potential difference caused by the current measured at some distance away from the electromagnetic source. The resulting electric potential difference may be measured using electromagnetic sensors, for example, that may be distributed on one or more streamers towed by survey vessel, located on one or more ocean bottom cables, or fixed at nodes at or near at a water bottom. The sensitivity of the potential difference to the subsurface resistivity may depend on the sensor offsets and the source signal frequencies.

Data may be collected from the marine electromagnetic survey to obtain information about the subsurface resistivities. The goal is typically to determine the subsurface resistivities as accurately as possible. Determination of the subsurface resistivities using the collected data commonly includes two major steps, commonly referred to as processing and inversion. Processing may be focused on providing good estimates of electromagnetic earth responses while suppressing ambient electromagnetic noise. Inversion may use the estimates of electromagnetic earth responses provided by the processing to search for a distribution of subsurface resistivities that may best fit the electromagnetic earth responses. This two-step approach may be attractive because it may separate the computationally intensive inversion step from the noise-focused processing step. However, this two-step approach may be sub-optimal as prior knowledge of subsurface resistivities may not be taken fully into account in determination estimates of electromagnetic earth responses in the processing step, and the inversion step does not take into account detailed knowledge about the noise and its properties.

BRIEF DESCRIPTION OF THE DRAWINGS

These drawings illustrate certain aspects of some of the embodiments of the present disclosure and may not be used to limit or define the disclosure.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The present disclosure relates to marine electromagnetic surveying and, more particularly, to systems and methods of determining subsurface resistivities in which processing and inversion are combined into a single step. Examples of the present disclosure may improve of the inversion of electromagnetic data to provide more accurate estimates of subsurface resistivities. Examples may also remove a portion of the processing of the electromagnetic data by implicitly including noise processing in the inversion. Accordingly, by combining of the inversion of the subsurface resistivities and noise parameters in a single step more accurate subsurface resistivities may be obtained.

As used herein, the term "inversion" generally refers to the solution to an "inverse problem," wherein an inverse problem in science is the process of calculating from a set of observations the causal factors that produced them. Commonly, inversion may be implemented as an iterative search for a set of factors, or values of parameters describing these factors, that may fit the observations. Often, an inverse problem does not have a unique solution. In embodiments, the "causal factors" of primary interest in marine electromagnetic surveying may be subsurface resistivities, and the process of estimating them is referred to as an inversion. The term inversion is used when the input may not be the observations themselves but the results from processing the observations. As used herein, the term "processing" refers to the calculation of electromagnetic earth responses from observations, with the aim of suppressing the ambient electromagnetic noise. In the present disclosure, this processing is distinct from inversion and is used to refer to disambiguation.

Figure 1:
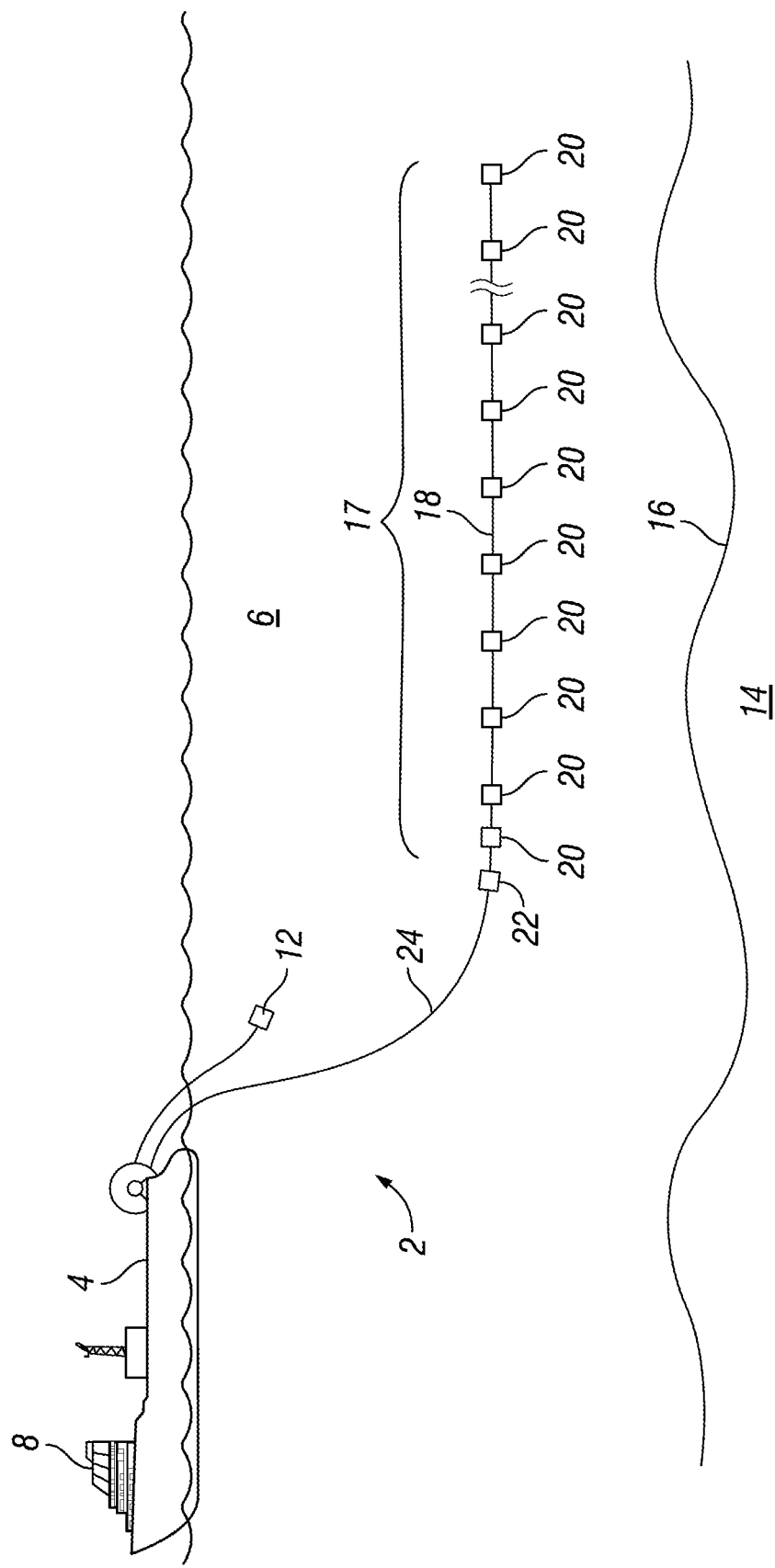
FIG. 1 illustrates an example embodiment of a marine electromagnetic survey system.

Referring now to FIG. 1, a marine electromagnetic survey system 2 may be illustrated in accordance with example embodiments. As illustrated, marine electromagnetic survey system 2 may include a survey vessel 4 moving along the surface of a body of water 6, such as a lake or ocean. Survey vessel 4 may include thereon equipment, shown generally at 8 and referred to for convenience as a "recording system." Recording system 8 may include devices (none shown separately) for navigating survey vessel 4, such as global positioning system ("GPS") receivers, for actuating at least one electromagnetic energy source 12, and for recording signals generated by electromagnetic sensors 20.

Survey vessel 4 and/or a different vessel (not shown) may tow at least one electromagnetic energy source 12. In the illustrated embodiment, energy source 12 may be towed above water bottom 16, wherein energy source 12 is disconnected from water bottom 16. Energy source 12 may be any selectively activating source suitable for marine electromagnetic surveying, such as one or more electromagnetic field transmitters. At selected times, energy source 12 may be actuated to generate an electromagnetic field that travels downwardly through the body of water 6 and formations 14 below water bottom 16. Specifically, electromagnetic energy source 12 may be activated to generate an electromagnetic field.

In some embodiments, survey vessel 4 may further tow a receiver array 17 comprising a plurality of electromagnetic sensors 20 at spaced apart positions. In the illustrated embodiment, receiver array 17 may be located on a single receiver cable, or "streamer" shown generally at 18, configured to be towable from the survey vessel 4 moving on the surface of the body of water 6. In other embodiments, receiver array 17 may be located on multiple streamers 18 displaced horizontally and/or vertically from one another. In alternative embodiments, receiver array 17 may include electromagnetic sensors 20 located on ocean bottom cables and/or nodes, fixed at or near water bottom 16, either in lieu of or in addition to electromagnetic sensors 20 on streamer 18 (or multiple streamers 18). In still other embodiments, additional electromagnetic sensors 20 may be located on streamers 18 towed by another vessel (not shown). As another alternative, one or more additional streamers (not shown) may be towed behind survey vessel 4, towed behind another vessel (not shown), located on an ocean bottom cable, or on nodes fixed at or near water bottom 16. Non-limiting examples of electromagnetic sensors 20 may include electromagnetic field sensors, such as receiver electrodes and magnetometers. The type(s) and configurations(s) of electromagnetic sensors 20 are not intended to limit the scope of the disclosure. Without limitation, electromagnetic sensors 20 may be used, for example, to acquire electromagnetic data, such as measurements of the potential difference influenced by the electromagnetic earth response of formations 14 below water bottom 16. Specifically, electromagnetic data may be acquired from the marine electromagnetic survey system 2 using the electromagnetic sensors 20. Electromagnetic sensors 20 may measure one or more various electric field properties, such as voltage, magnetic field amplitude, and/or magnetic field gradient.

Streamer 18 may be coupled at its forward end (with respect to direction of movement of the survey vessel 4) to a termination 22 which may couple the streamer 18 to a lead-in cable 24. Lead-in cable 24 may transmit towing force, power, and/or signals between survey vessel 4 and streamer 18. While not illustrated, streamer 18 may include a number of different devices in addition to electromagnetic sensors 20, such as lateral force and depth control devices (e.g., birds having variable incidence wings) to regulate streamer 18 depth, seismic sensors, depth sensors, velocity sensors, accelerometers, magnetometers, and/or positions sensors, among others. While only a single streamer 18 may be shown, it may be understood that the disclosure is applicable to a receiver array 17 that includes any number of laterally spaced apart streamers 18 towed by survey vessel 4 and/or any other vessel. For example, in some embodiments, two or more laterally spaced apart streamers 18 may be towed by survey vessel 4. "Lateral" or "laterally," in the present context, means transverse to the direction of the motion of survey vessel 4. Lateral positioning of streamers 18 may be maintained by various towed devices (e.g., deflectors, paravanes, doors, etc.) that may generate lateral force as moved through body of water 6. In some embodiments, multiple laterally spaced apart streamers 18 may be towed by survey vessel 4. Accordingly, the number of streamers 18 and their particular geometric configuration in body of water 6 may not considered a limitation on the scope of the present disclosure.

As previously disclosed, electromagnetic sensors 20 may be used to acquire electromagnetic data. The electromagnetic data may contain measurements of various electric field properties of the electromagnetic field generated as a result of the interaction of the induced electromagnetic field with formations 14 below water bottom 16. The measurement may be, for example, induced voltage, magnetic field amplitude and/or magnetic field gradient, such that the electromagnetic data represent one or more electric field properties. Electromagnetic sensors 20 may acquire electromagnetic data when electromagnetic energy source 12 generates a source signal. The source signal may be single pulses and/or continuous sweeps of electromagnetic energy. A marine electromagnetic survey system 2 typically may comprise several lines (paths of travel for survey vessel 4) planned to cover the area under consideration with sufficient spatial sampling density. Each line may be divided into shots, where, for a marine electromagnetic survey, a shot may be a spatial sample point for which an electromagnetic earth response may be estimated, rather than a physical "shot" in the seismic sense. In a marine electromagnetic survey, the source signal may be continuous for the whole line, and may be of a single frequency and/or amplitude, or continuously varying. Each electromagnetic shot thus may comprise one sequence of time domain samples per electromagnetic sensor 20. The source signal from electromagnetic energy source 12 may also be measured separately.

In accordance with an embodiment of the disclosure, a geophysical data product indicative of certain properties of the formations 14 may be produced from the measured electromagnetic signal and electromagnetic earth response thereto. The geophysical data product may include acquired and/or processed electromagnetic data and may be stored on a non-transitory, tangible computer-readable medium. The geophysical data product may be produced offshore (i.e. by equipment on a vessel) or onshore (i.e. at a facility on land) either within the United States and/or in another country. Specifically, embodiments may include producing a geophysical data product from at least the subsurface resistivites and storing the geophysical data product on a tangible, non-volatile computer-readable medium suitable for importing onshore. If the geophysical data product is produced offshore and/or in another country, it may be imported onshore to a facility in, for example, the United States. Once onshore in, for example, the United States, further processing and/or geophysical analysis may be performed on the geophysical data product.

As apparent to those of ordinary skill in the art, marine electromagnetic surveying may be used to map the electrical subsurface resistivity and/or conductivity of subsurface formations (e.g., formations 14 shown on FIG. 1). In marine electromagnetic surveying, electromagnetic data may be acquired, which may be processed to obtain information about the resistivity distribution, primarily in the subsurface. In embodiments, m may denote resistivities that may determine the electromagnetic response of the earth. Specifically, the earth's impulse response between the source and sensor k may be denoted as $g_k$ (m, t) where t may be a continuous time. The impulse response may be described as source current that may be converted to voltage over sensor k. The resulting potential difference $r_k$ (m, t) at the sensor may be described mathematically as a convolution of the source current s(t) and the specific impulse response: $r_k(m, t) = (g_k(m)*s)(t) = \int g(m, \tau) s(t-\tau) d\tau$. Specifically, $r_k(m, t) = (g_k(m)*s)$ $(t)=\int g(m, \tau)s(t-\tau)d\tau$ may describe the electrical potential difference between electrodes which may be due to electric fields generated by electromagnetic energy source 12. In examples, $s(t)$ may be described as the electrical current moving through electromagnetic energy source 12, which may be measured and digitized as $s_n$. Electrical current moving through electromagnetic energy source 12 may comprise current generated electric fields at electrode pairs 20 and an electric field influenced by resistivites m in air, water, and formations 14. The total potential difference $d_k$ (m, t) at sensor k may include ambient noise $v_k$ ($a_k$, t) in which $d_k$ (m, a, t)=$r_k$ (m, t)+$v_k$ ($a_k$, t). Therefore, $a_k$ may denote parameters that may describe properties of the physical generation of noise. Additionally, ambient noise, described as $v_k$ ($a_k$, t), may be created from movement through earth's magnetic field, water flow (waves, turbulence, etc.), eg. swell noise, and/or atmospheric and solar activity, eg. magneto-telluric noise (MT). One such physical property may be the large and fairly coherent waves that may generate electromagnetic fields at the sensor. Additional properties may be the level of magneto-telluric activity, which may cause low frequency electric fields of potentially with a very large magnitude.

The digitized electromagnetic data may be acquired by K electromagnetic sensors (e.g., electromagnetic sensors 20 on FIG. 1), for N sampling times over an area whose resistivity may be described by the parameters m. Accordingly, the electromagnetic data sample $d_{k,n}$ at sampling time n and sensor k may be expressed by Equations (1) and (2):

$$d_{k,n} = \begin{bmatrix} s_n & s_{n-1} & \ldots & s_{n-M} \end{bmatrix} \begin{bmatrix} g_{k,n,0}(m) \\ \vdots \\ g_{k,n,1}(m) \\ g_{k,n,M}(m) \end{bmatrix} + v_{k,n}(a_k) + e_{k,n} \quad (1)$$

$$= s_n^T g_{k,n,-M}(m) + v_{k,n}(a_k) + e_{k,n}, \quad (2)$$

where the continuous time convolution is replaced by an equivalent vector multiplication, and noise $e_{k,n}$ from the recording system 8 is added. Furthermore, $d_{k,n}$ is the electric potential over sensor k, $s_n$ is the discretized current through electromagnetic energy source (e.g., electromagnetic energy source 12 on FIG. 1) or the source signal, which may be measured accurately that it may be considered to be perfectly known, $g_{k,n}(m)$ is the discretized electromagnetic earth response for sensor k, which may be unknown, $v_{k,n}$ is the ambient electromagnetic noise, which may also be unknown, n is the sampling index, k is the sensor index (e.g., index of electromagnetic sensors 20), $a_k$ are the noise parameters, and m are the resistivities, including the subsurface resistivities of primary interest. Equation (2) may also be extended to cover all N samples for all K sensors by stacking the data in a single vector:

$$d = S^T g(m) + v(a) + e \quad (3)$$

where d is a vector containing all data from all sensors, S is a matrix with source signal samples/bins, $g(m)$ are the electromagnetic earth responses, for example, a vector of stacked impulse/frequency responses, $v(a)$ is the ambient electromagnetic noise, for example, a vector with ambient noise samples (in some embodiments, all ambient noise samples), and e is system measurement noise, for example, a vector with system measurement noise samples (in some embodiments, all system noise samples).

It may be desirable to calculate subsurface resistivities in m as close to the actual subsurface resistivities as possible. As illustrated in Equation (3), the resistivities m may not be the only "causal factors" and joint inversion for m and a may be an additional valid approach. Traditionally, the overall goal may be to determine the subsurface resistivities in m, which may provide a basis for decisions on hydrocarbon prospecting. The goal may be pursued via a two-stage procedure of processing (noise reduction and deconvolution to calculate an estimate of g) and inversion for m (using the estimates of g to search for the resistivities). Separation into noise-focused processing and geophysics-focused inversion may be suboptimal as only a subset of all information is used in each step.

This two-step approach to determine subsurface resistivities m has been used previously as it separates the computationally intensive step of inversion from the noise-focused step of processing. However, this two-step approach may not always provide desired results because the determination of electromagnetic earth response estimates ĝ in processing does not consider the subsurface resistivities m and the inversion does not take ambient electromagnetic noise v into account. It may be a typically case that electromagnetic earth responses may vary slower with changing position than with the ambient noise. Therefore, averaging of the data in some form may reduce noise levels without removing data features related to subsurface resistivities. Specifically, averaging over possible noise parameters. This may be accomplished by common processing algorithms, which may incorporate averaging. However, the optimal averaging scheme must depend on subsurface resistivities themselves and adapt to varying distributions, which may be unknown. In embodiments, optimal inversion may take data quality into account to avoid fitting resistivity values to unrelated noise contributions. However, the noise contribution may be unknown and may not be perfectly separated from a desired signal. Therefore, the two-step approach may be sub-optimal, and a single step method that combines processing and inversion may provide more accurate resistivity estimates.

Some embodiments may include combining processing and inversion into a single step, since processing and inversion are both parts of the same inverse problem, going from data d to (subsurface) resistivities m, and combine the forward modeling of inversion with the noise modeling of processing. In equation (3) above, there may be two main unknowns, namely the electromagnetic earth response $g(m)$ and the ambient electromagnetic noise $v(a)$. The system noise parameters e may be small, temporally white, and may be included in the ambient electromagnetic noise $v(a)$ in some instances. Embodiments of a single-step method may comprise modelling both electromagnetic earth responses $g(m)$ and noise $v(a)$ simultaneously. This may allow for constraints being applied simultaneously obtaining desired performance. In some embodiments, the data d may not be processed with ad hoc methods before input into the single step method. For example, there may be no need to perform running averages of ad hoc length to reduce noise, or perform other generic noise reducing techniques such as low rank reconstructions.

To find subsurface resistivities, the technique may first include identifying electromagnetic data. Specifically, identifying electromagnetic data acquired from one or more electromagnetic sensors, wherein the electromagnetic data includes a source-generated signal and noise. The electromagnetic data may be from one or more electromagnetic sensors (e.g., electromagnetic sensors 20 shown on FIG. 1). The electromagnetic data that is identified may include electromagnetic data that was collected using a marine electromagnetic survey, such as marine electromagnetic survey system 2 shown on FIG. 1, which may use a streamer 18 and electromagnetic sensors 20 to create a magnetic field. As previously described, a recording system 8 may be used to record the electromagnetic data. During the identifying, the electromagnetic data may be acquired and stored for the subsequent joint estimation. The electromagnetic data may include the source-generated signal and noise. The noise may include ambient electromagnetic noise, for example electric fields caused by water flow and waves, and system measurement noise, for example from signal amplifiers. The source-generated signal at the sensors may include fields propagated from the source electrodes through the air, the body of water 6 or the subsurface structures.

Finding subsurface resistivites may further include jointly inverting for (subsurface) resistivities and noise parameters based on the electromagnetic data. Specifically, jointly inverting at least a subsurface resistivities and noise parameters based on the electromagnetic data, wherein joint inversion may comprise simultaneous modeling of electromagnetic earth responses and noise parameters. The noise parameters may include the level of background noise such as the Schumann resonances from lightning discharges in the ionosphere, the level of swell generated noise, or other noise levels that may vary. Noise parameters may in other instances be the parameters in a generic noise model for some or all contributions, for instance an auto-regressive (AR) model that may describe the noise spectrum and variations therein. Parameters may be physical and/or chosen to capture overall characteristics of the noise. The steps of identifying and jointly inverting may be done by a data processing system (e.g., data processing system 32 shown on FIG. 2). When processing data in a joint inversion, subsurface resistivities and noise parameters that have been inverted may be grouped into sub-vectors, based on where the electromagnetic data was collected by electromagnetic sensors 20. These groups may then be analyzed to determine the characteristics of the noise associated within each group. These characteristics may then be interpreted using prior acquired data (e.g., by the same or a different marine electromagnetic survey) to determine subsurface resistivity of a particular group.

Prior approaches to regularized inversion for (subsurface) resistivities may include inverting for the (subsurface) resistivities m using estimated electromagnetic earth responses $\hat{g}$ and may attempt to minimize a cost function. A regularized cost function for a set of estimated resistivities $\hat{m}$ may be expressed in equation form as below:

$$F(\hat{m}) = F^{LS}(\hat{m}) + \alpha F^R(\hat{m}) \quad (4)$$

where first term $F^{LS}(\hat{m})$ is the least squares (LS) data misfit and the second term $F^R(\hat{m})$ is an additive regulariser weighted with $\alpha$. The data misfit may be expressed as:

$$F^{LS}(\hat{m}) = (g(\hat{m}) - \hat{g})^H W^2 (g(\hat{m}) - \hat{g}) \quad (5)$$

where W is a (diagonal) weight matrix, for instance based on the quality of estimated earth response responses $\hat{g}$. The quality may be closely related to the noise and the noise parameters. This misfit term may make a good fit between modelled electromagnetic earth responses $g(\hat{m})$ for the estimated resistivities and estimates $\hat{g}$ of the electromagnetic earth responses. The regularizing term may be inserted to stabilize the inversion and may be written:

$$F^R(\hat{m}) = \|W_e(\hat{m}) W_t (\hat{m} - m_{pr})\|^2 \quad (6)$$

Equation 6 may include a sensitivity-equalizing matrix $W_t$ operating on a prior estimate $m_{pr}$, and a reweighting diagonal matrix $W_e$. In some embodiments, the minimum of the criterion may be sought using a form of gradient, based on local searches, but other methods such as genetic algorithms and other Monte Carlo methods may also be used.

However, the above approach using equations (5) and (6) may be focused on subsurface resistivities, and may use fixed weights based on fixed (known) error/noise estimates. As mentioned above, noise may be a major unknown contribution to the electromagnetic data. In contrast, embodiments of the present disclosure may include reformulating the inversion problem including the noise parameters in a joint inversion using a parameterization of the noise parameters. Referring to the cost functional in Equation (4), Equation (4) may be reformulated to $$F(\hat{m}, \hat{a}) = F^{LS}(\hat{m}, \hat{a}) + \alpha F^R(\hat{m}, \hat{a}). \quad (7)$$

One example technique for joint inversion of subsurface resistivity and noise parameters will now be described in more detail. As an example, equation (3) may be considered using the following probability distributions, which may be defined below:

M: logNormal $(\mu, Q)$
V: normal $(0, R(a))$
E: normal $(0, \sigma_e^2, I)$ where $\mu$ is the prior mean for $\log(m)$ and Q is the associated covariance matrix (uncertainty), $R(a)$ is the covariance for the noise as parameterized by a, and $\tau_e^2$ is the measurement variance. It may be shown that the maximum a posteriori (MAP) estimate of the inversion parameters $\{m, a\}$ may be attained by minimizing the misfit expression in Equation (7) with the data misfit term represented by:

$$F^{LS}(\hat{m}, \hat{a}) = (d - S^T g(\hat{m}))^T (R(\hat{a}) + \sigma_e^2 I)^{-1} (d - S^T g(\hat{m})) \quad (8)$$

Specifically, minimizing a misfit expression with respect to subsurface resistivities and noise parameters with a weight structure that is fixed. The regularizing (stabilizing) term may be represented by:

$$F^R(\hat{m}, \hat{a}) = F(\hat{a}) + \ln(|R(\hat{a}) + \sigma_e^2 I|) + 2 \Sigma_{l=1}^L \ln(\hat{m}_l) + (\ln(\hat{m}) - \mu)^T Q^{-1} (\ln(\hat{m}) - \mu). \quad (9)$$

Different scenarios and assumptions may be used based on found data, as long as the noise contribution is determined as part of the inversion via a (and $\sigma_e^2$) parameters.

Examples of the present disclosure, as compared to other approaches, may not include fixing weights before computation. Rather, the weight structure may be fixed while the whole misfit expression may be minimized with respect to m and a. This may be illustrated by comparing Equation (5) and Equation (8), where the fixed weight matrix W for $\hat{m}$ in Equation (5) may have been replaced by $\hat{a}$, with dependent weights in Equation (8). Poor data with small signal-to-noise ratio is typically discarded in the conventional inversion for m because they carry very little information to guide the inversion. Instead, high quality data, which may consist of a few distinct spectral peaks in an optimized repeated source signal, may be selected and used. In contrast, examples of the present disclosure may include the use of data which may be comprised of a small signal-to-noise ratio, because the data may be the best to determine noise parameters a. Consequently, the present disclosure may use low quality data to determine the best weights in an inversion for m. This may be achieved by the suggested joint inversion.

In some instances, search procedures including a gradient-based local search and genetic algorithms, among others may be used. Examples may include a joint inversion performed directly on all unprocessed data, but may also be used on decimated data sets (to save computational time, for instance) and/or data that have been processed. The inversion may be performed for (subsurface) resistivities m based on different noise parameters a, or otherwise average the inversion result over possible a. In these instances a may still include parameters that are active in the joint inversion but may be exploited differently.

Additionally, noise parameters a may further be identified by auxiliary data. Auxiliary data may comprise information provided by accelerometers, magnetometers, gyroscopes, and/or the like. Positioning data recorded by these devices may help in the identification of noise parameters by using physical models for how noise is generated. One example is the relation between the motion of conducting wires through the earth's magnetic field and the induced current in the wire. The measurements of motion can thus help to determine the recorded electric noise. A second example is the use of magnetometers to detect magneto-telluric (MT) activity that also manifests itself as electric noise in the recorded data. Patent U.S. Pat. No. 7,671,598B2 describes one methodology where motion sensors are used to estimate noise in marine EM data.

Figure 2:
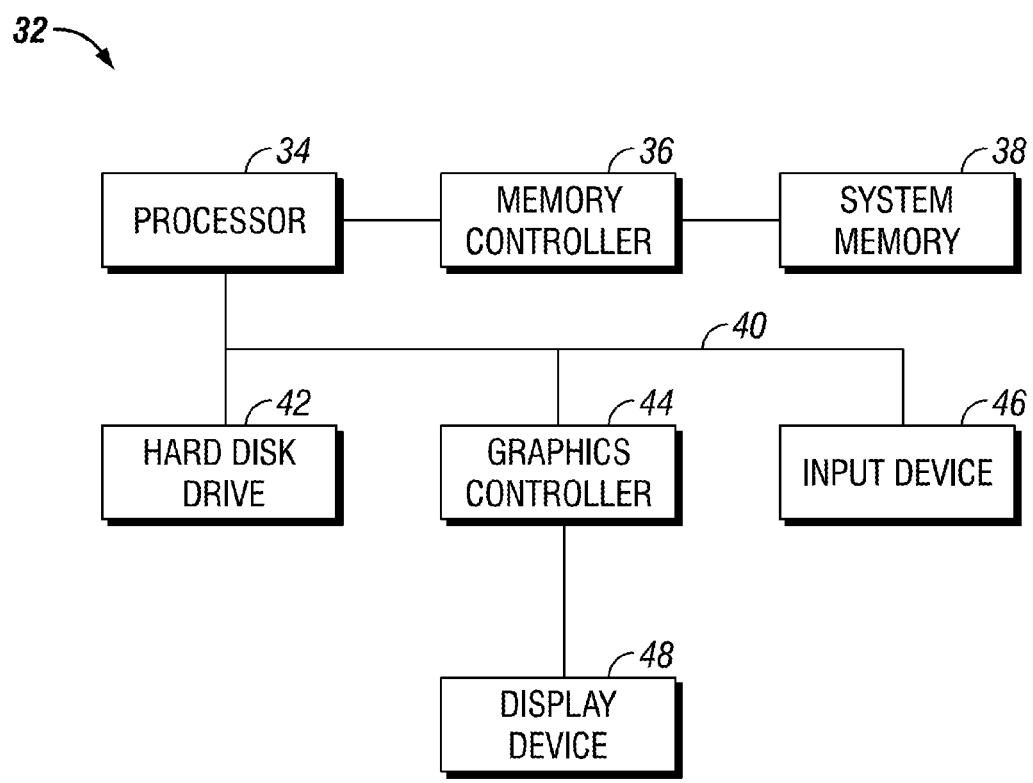
FIG. 2 illustrates an example embodiment of a data processing system.

FIG. 2 illustrates one embodiment of a data processing system 32 that may be utilized in accordance with embodiments of the present invention. In some embodiments, the data processing system 32 may be a component of the recording system 8 (e.g., FIG. 1). The data processing system 32 may be used for implementation of the previously described techniques for the joint inversion of subsurface resistivities and noise parameters. Special or unique software for receiving the inputs, data processing, and sending output signals may be stored in the data processing system 32 and/or on external computer readable media. Those of ordinary skill in the art will appreciate that the data processing system 32 may comprise hardware elements including circuitry, software elements including computer code stored on a machine-readable medium or a combination of both hardware and software elements. Additionally, the blocks shown on FIG. 2 are but one example of blocks that may be implemented. A processor 34, such as a central processing unit or CPU, may control the overall operation of the data processing system 32. The processor 34 may be connected to a memory controller 36, which may read data to and write data from a system memory 38. The memory controller 36 may have memory that includes a non-volatile memory region and a volatile memory region. The system memory 38 may be composed of a plurality of memory modules, as will be appreciated by one of ordinary skill in the art. In addition, the system memory 38 may include non-volatile and volatile portions. A system basic input-output system may be stored in a non-volatile portion of the system memory 38. The system basic input-output system is adapted to control a start-up or boot process and to control the low-level operation of the data processing system 32.

The processor 34 may be connected to at least one system bus 40 to allow communication between the processor 34 and other system devices. The system bus 40 may operate under a standard protocol such as a variation of the Peripheral Component Interconnect (PCI) bus or the like. In the example embodiment shown in FIG. 2, the system bus 40 may connect the processor 34 to a hard disk drive 42, a graphics controller 44 and at least one input device 46. The hard disk drive 42 may provide non-volatile storage to data that may be used by the data processing system 32. The graphics controller 44 may be in turn connected to a display device 48, which may provide an image to a user based on activities performed by the data processing system 32. The memory devices of the data processing system 32, including the system memory 38 and the hard disk drive 42 may be tangible, machine-readable media that store computer-readable instructions to cause the processor 34 to perform a method according to an embodiment of the present techniques.

Therefore, the present disclosure may well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as disclosed in the claims below. It is therefore evident that the particular illustrative embodiments disclosed above may be altered or modified and all such variations are considered within the scope and spirit of the present disclosure. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification may be adopted for the purposes of understanding this disclosure.

What is claimed:

1. A method to determine subsurface resistivities using marine electromagnetic surveying, comprising:
    activating one or more electromagnetic energy sources to generate an electromagnetic field;
    measuring potential differences with one or more electromagnetic sensors to obtain electromagnetic data from the potential differences measured by the one or more electromagnetic sensors, wherein the electromagnetic data includes a source-generated signal and noise;
    storing the electromagnetic data as a geophysical data product on a tangible non-volatile storage:
    transporting the geophysical data product;
    jointly inverting for subsurface resistivities and noise parameters based on the electromagnetic data wherein the jointly inverting for subsurface resistivities and the noise parameters comprises simultaneous modeling of electromagnetic earth responses and noise parameters using the electromagnetic data to obtain the subsurface resistivities and the noise parameters;
    grouping the jointly inverted subsurface resistivities and noise parameters into sub-vectors, wherein the sub-vectors are associated with the electromagnetic data captured by the one or more electromagnetic sensors; and
    producing noise characteristics from each of the sub-vectors and interpreting the noise characteristics using prior acquired data to determine subsurface resistivities for each of the sub-vectors; and
    performing hydrocarbon prospecting based on at least the subsurface resistivities.

2. The method of claim 1, wherein the step of jointly inverting comprises averaging over possible noise parameters.

3. The method of claim 1, wherein the step of jointly inverting comprises simultaneous modeling of electromagnetic earth responses and noise parameters.

4. The method of claim 1, wherein the step of jointly inverting comprises minimizing a misfit expression with respect to subsurface resistivities and noise parameters with a weight structure that is fixed.

5. The method of claim 1, wherein the electromagnetic data on which the jointly inverting is based has not been processed.

6. The method of claim 1 further comprising producing a geophysical data product from at least the subsurface resistivities and storing the geophysical data product on a tangible, non-volatile computer-readable medium suitable for importing onshore.

7. The method of claim 6, further comprising importing the geophysical data product onshore and performing further data processing or geophysical analysis on the geophysical data product.

8. The method of claim 1, further comprising acquiring the electromagnetic data for a marine electromagnetic survey using the electromagnetic sensors.

9. The method of claim 8, wherein the electromagnetic sensors are disposed on a streamer towable by a survey vessel, located on an ocean bottom cable, or fixed at or near a water bottom.

10. The method of claim 8, further comprising activating an electromagnetic energy source to generate an electromagnetic field.

11. The method of claim 1, further comprising identifying noise parameters with recorded auxiliary data.

12. A marine electromagnetic survey system, comprising a data processing system configured to at least: (i) identify electromagnetic data acquired from one or more electromagnetic sensors, wherein the electromagnetic data includes a source-generated signal and noise; (ii) jointly invert for subsurface resistivities and noise parameters based on the electromagnetic data; and (iii) generate an image representing subsurface resistivities and noise parameters, wherein the data processing system implements the joint inversion for subsurface resistivities and noise parameters.

13. The system of claim 12, further comprising a streamer, wherein the streamer comprises the one or more electromagnetic sensors.

14. The system of claim 13, wherein the streamer is configured to be at least one of located on a streamer towable by a survey vessel, located on an ocean bottom cable, or fixed at or near a water bottom.

15. The system of claim 12, wherein the one or more electromagnetic sensors comprise at least one of receiver electrodes or magnetometers.

16. The system of claim 14, wherein the electromagnetic data that is identified is unprocessed.

17. The system of claim 12, where the data processing system is configured to jointly invert subsurface resistivities and noise parameters using at least simultaneous modeling of earth responses and noise parameters.

18. The system of claim 12, where the data processing system is configured to jointly invert subsurface resistivities and noise parameters by at least minimizing a misfit expression with respect to subsurface resistivities and noise parameters with a weight structure that is fixed.

19. A non-transitory machine-readable medium storing instructions executable by a data processing system to cause the machine to:
 identify electromagnetic data with one or more electromagnetic sensors, wherein the electromagnetic data includes a source-generated signal and noise;
 jointly invert for subsurface resistivities and noise parameters based on the electromagnetic data; and
 generate an image representing subsurface resistivities.

20. The non-transitory machine-readable medium of claim 19, wherein the instructions further cause the machine to jointly invert subsurface resistivities and noise parameters using at least simultaneous modeling of earth responses and noise parameters.

21. The non-transitory machine-readable medium of claim 19, wherein the instructions further cause the machine to jointly invert subsurface resistivities and noise parameters by at least minimizing a misfit expression with respect to subsurface resistivities and noise parameters with a weight structure that is fixed.

22. In a process for determining subsurface resistivities of a subterranean formation using marine electromagnetic surveying in which at least one electromagnetic field transmitter is activated in a body of water to generate an electromagnetic field, wherein measurements of electromagnetic potential differences in the electromagnetic field using one or more electromagnetic sensors are captured in a recording for use in generating the subsurface resistivities, wherein the recording of the electromagnetic potential differences comprises a source-generated signal and noise, wherein the specific improvement comprises:
 generating a modified version of the recording, wherein the generating the modified version comprises simultaneous modeling of electromagnetic earth responses and noise in a joint inversion.

* * * * *